(12) United States Patent
Jodra

(10) Patent No.: US 7,672,521 B2
(45) Date of Patent: Mar. 2, 2010

(54) SYSTEM AND METHOD FOR IMPROVED PAGE COMPOSITION

(75) Inventor: Rodolfo Jodra, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 887 days.

(21) Appl. No.: 10/929,232

(22) Filed: Aug. 30, 2004

(65) Prior Publication Data

US 2006/0045358 A1    Mar. 2, 2006

(51) Int. Cl.
G06K 9/46 (2006.01)
(52) U.S. Cl. ............... 382/235; 382/232; 382/233; 382/243; 707/101; 358/1.9; 358/1.18
(58) Field of Classification Search ............ 382/232, 382/233, 235, 243; 358/1.9, 1.18, 1.19; 707/101
See application file for complete search history.

(56) References Cited

U.S. PATENT DOCUMENTS

| | | | | |
|---|---|---|---|---|
| 5,542,031 A * | 7/1996 | Douglass et al. | ............ | 358/1.15 |
| 5,634,089 A * | 5/1997 | Kulbida et al. | ............... | 358/1.9 |
| 5,999,189 A * | 12/1999 | Kajiya et al. | ................ | 382/232 |
| 6,049,390 A * | 4/2000 | Notredame et al. | ........ | 358/1.15 |
| 6,091,482 A | 7/2000 | Carter et al. | | |
| 6,272,252 B1 | 8/2001 | Eldridge et al. | | |
| 6,330,363 B1 * | 12/2001 | Accad | ........................ | 382/232 |
| 6,377,354 B1 | 4/2002 | Nguyen et al. | | |
| 6,424,342 B1 * | 7/2002 | Perlman et al. | ............. | 382/232 |
| 6,466,210 B1 | 10/2002 | Carlsen et al. | | |

(Continued)

FOREIGN PATENT DOCUMENTS

JP    11252366    9/1999

(Continued)

OTHER PUBLICATIONS

Chang et al., Manipulation and Compositing of MC-DCT Compressed Video, Jan. 1995, IEEE Journal on Selected Areas in Communications, vol. 13, No. 1, pp. 1-10.*

(Continued)

Primary Examiner—Vikkram Bali
Assistant Examiner—Daniel Zeilberger

(57) ABSTRACT

A system and method for page composition in a processor-controlled printing system. Formatted image data is first received to a processor, the data representing image elements to be merged into a new document. At least one compressed cell describing each of the page elements is generated based on the formatted image data. A compressed cell contains pixilated image data of a predetermined pixel size. An element table including at least one cell pointer for each page element is generated. Each cell pointer includes a memory location and a cell type for each compressed cell that is pointed to by the generated element table. A merged page is composed based on the cell type entries of the element tables. A page composition system and a computer readable media having computer instructions for implementing the method of page composition are also provided.

39 Claims, 7 Drawing Sheets

U.S. PATENT DOCUMENTS

| | | |
|---|---|---|
| 6,600,571 B1 | 7/2003 | Ito |
| 6,672,212 B1 | 1/2004 | Ferlitsch |
| 6,731,814 B2 * | 5/2004 | Zeck et al. .................. 382/233 |
| 2002/0018233 A1 | 2/2002 | Mori |
| 2002/0024603 A1 | 2/2002 | Nakayama et al. |
| 2002/0078837 A1 * | 6/2002 | Hashimoto .................. 101/116 |
| 2002/0196467 A1 * | 12/2002 | Delhoune et al. .......... 358/1.18 |
| 2003/0035135 A1 | 2/2003 | Corrales |
| 2003/0086127 A1 * | 5/2003 | Ito et al. .................... 358/462 |
| 2003/0219163 A1 * | 11/2003 | Kelly ......................... 382/245 |
| 2004/0146199 A1 * | 7/2004 | Berkner et al. .............. 382/176 |

FOREIGN PATENT DOCUMENTS

| | | |
|---|---|---|
| JP | 11296334 | 10/1999 |
| WO | WO 99/17258 | 4/1999 |

OTHER PUBLICATIONS

British Search Report dated Aug. 26, 2005.

\* cited by examiner

SYSTEM AND METHOD FOR IMPROVED PAGE COMPOSITION

The computer program listing contained in two duplicate files present on two duplicate CD-ROMs submitted to the United States Patent Office pursuant to 37 CFR §§1.52(e) and 1.96(c) is incorporated by reference herein The file, contained on each CD-ROM, is entitled "200311923-1 Computer Code Listing.txt" and has a size of 24 KB. The duplicate CD-ROMs and contents were created on 19 Nov. 2009.

BACKGROUND

Imaging systems typically integrate a processor and software that work together to provide various imaging functions such as printing. Imaging systems are often required to combine multiple images, called elements, onto a composed page. A composed page is generally a composite of page elements from several sources, such as user-placed images, scanned data, text and other types of images. The page composition process positions images in the appropriate location on a page and also provides rotation and mirroring effects. For color imaging systems, in order to first determine a color for each pixel on the page, it is necessary to first read all of the elements which potentially affect the pixel, even if only one of several elements will eventually define the color of the pixel. One page composition technique uses a frame buffer for the composed page. All of the elements are drawn into the frame buffer, which then represents the composite image. However, a large frame buffer is required and the image elements must be moved from memory into the frame buffer. When elements overlap, some of the element data may be moved into the buffer but subsequently ignored because another element covers it. Additionally, image elements are typically compressed in memory and must be decompressed into the frame buffer which operates only on uncompressed data. Subsequently, a large bandwidth overhead is incurred in the imaging system to move data in and out of the frame buffer during a page composition.

SUMMARY

According to an embodiment of the present invention a method is directed to page composition in a processor-controlled printing system that includes receiving formatted image data representing at least one page element for each page of a plurality of pages, and generating at least one compressed cell describing each page element based on the received formatted image data where the compressed cell contains pixilated image data and where the cell has a predetermined pixel size. The method further includes generating an element table including at least one cell pointer for each page element, wherein each cell pointer includes a memory location and a cell type for the generated at least one compressed cell. The method additionally includes composing a merged page based on the cell type entries of the element tables.

According to another embodiment, a method is directed to producing a composed image from a plurality of page elements in a processor-controlled printing system. The method includes producing a first element table and at least a second element table, wherein the first element table defines a first page element and the second element table defines at least a second page element. The first and second element tables also each include at least one pointer to a memory address of a compressed cell describing a first page element and at least a second page element, the page elements corresponding to overlapping regions of a page. The method further includes reading a first pointer from the first element table and at least a second pointer from the second element table, wherein the pointers indicate a cell type and the first and second pointers correspond to an overlapping region. The method also includes generating a composed image table defining a composed image based on the first and at least second pointers. If the first and at least second pointers do not indicate a partially transparent cell type, then the pointer of any of the first or at least second pointers having an opaque cell type is assigned to the composed image table for the corresponding overlapping region. If the second pointer indicates a transparent cell type, then the first pointer is assigned to the composed image table for the corresponding overlapping region. Finally, if any of the first or at least second pointers indicate a partially transparent cell type, then a cell merge process is initiated to produce a merged cell for the corresponding overlapping region from a first and at least second cell pointed to by the first and at least second pointers, and wherein the merged cell is assigned a memory address that is pointed to by the composed image table.

According to still another embodiment, an imaging apparatus configured to provide page composition is provided that includes a communication bus, at least one processor, and at least one computer readable memory device which is readable by the processor. The computer readable memory device contains a series of computer executable steps configured to cause the processor to receive formatted image data representing at least one page element for each page of a plurality of pages, generate at least one compressed cell describing each page element (based on the received formatted image data, wherein the compressed cell contains pixilated image data and where the cell has a predetermined pixel size), generate an element table including at least one cell pointer for each page element (wherein each cell pointer includes a memory location and a cell type for the generated at least one compressed cell), and compose a merged page based on the cell type entries of the element tables.

The foregoing and other features and advantages of the invention will become further apparent from the following detailed description of the presently preferred embodiments read in conjunction with the accompanying drawings.

DETAILED DESCRIPTION

Non-limiting embodiments of the present invention provide for methods and systems for improved page composition. According to an embodiment of the present invention, an imaging apparatus configured to provide page composition is provided. The page composition hardware combines software preprocessing, compression, and imaging to merge multiple page elements on a page on a new page ready to render.

Figure 1:
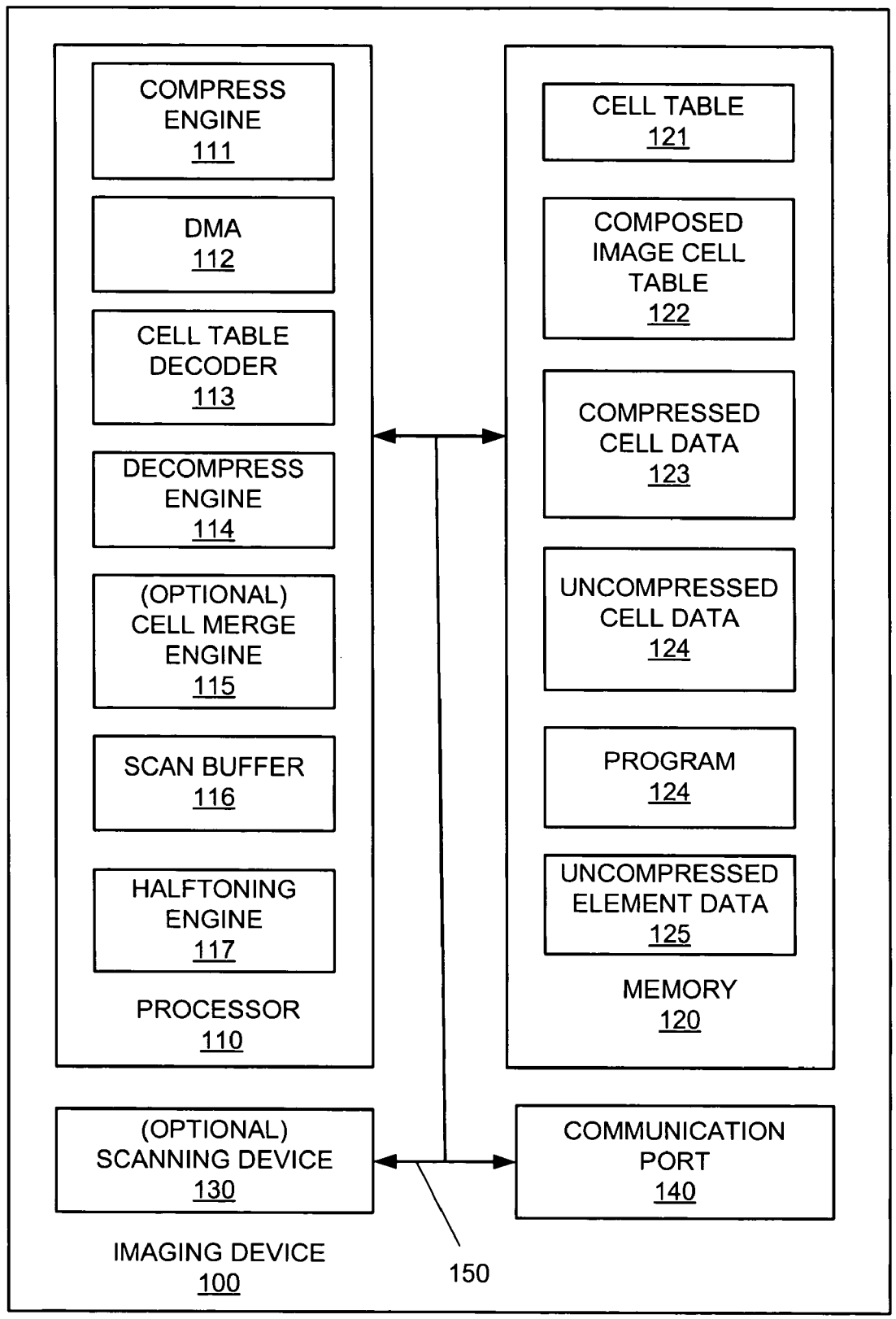
FIG. 1 is a block diagram of an imaging device, illustrating an exemplary operating environment for an embodiment of the present invention.

FIG. 1 is a block diagram of an imaging device 100, illustrating an exemplary operating environment for an embodiment of the present invention. FIG. 1 shows an imaging device 100 having a processor 110, memory 120, an optional scanning device 130, a communication port 140, and a data bus 150. The processor 110 is shown further comprising a compression engine 111, a Direct Memory Access (DMA) module 112, a cell table decoder 113, a decompression engine 114 and optional cell merge engine 115, a scan buffer 116, and a half-toning engine 117. The memory 120 is shown further comprising a cell table 121, a composed image cell table 122, compressed cell data 123, uncompressed cell data 124, program 124, and uncompressed element data 125. In FIG. 1, data bus 150 is shown enabling bidirectional signal communication between processor 110, memory 120, communication port 140, and optional scanning device 130. In an embodiment, imaging device 100 is a device such as, for example, printer, a multi-function peripheral device, a plotter, a scanner and the like.

Processor 110 is any microprocessor, microcontroller, application-specific integrated circuit (ASIC), or combination of the recited components, configured to execute program instructions. In an embodiment, processor 111 includes memory for caching data, and performing digital signal processing, such as, for example, various image processing algorithms. In an embodiment, (not shown) one or more additional processors are included in imaging device 100 to provide imaging device performance enhancement.

Compression engine 111 is any data compression implementation including hardware and software configured for lossless and/or lossy data compression to memory 120. Direct memory management (DMA) 112 includes any data memory management implementation including hardware and software configured for managing data stored in memory 120. DMA 112 systems are well known to the skilled practitioner and will not be further discussed. Cell table decoder 113 is any cell table management implementation including hardware and software configured for managing and decoding cell table data stored in memory 120. Decompression engine includes any data decompression implementation including hardware and software configured for decompressing lossless and/or lossy compressed data stored in memory 120. Cell merge engine 115 includes any cell merge implementation including hardware and software configured for accessing cells stored in memory 120, and generating merged cell data based on the content of the accessed cells. Scan buffer 116 is any volatile or non-volatile memory implementation configured to provide buffer memory for scan line data. Scan buffers are well known to the skilled practitioner and will not be further discussed. Half-toning engine 117 includes any half-toning implementation including hardware and software configured for generating half-toning data for rendering images from data stored in memory 120. Hal-toning engines are well known to the skilled practitioner and will not be further discussed. In one embodiment (not shown), one or more of the above components of processor 110 are not integrated into processor 110, but are components of a more extended processing system that includes processor 110 and other operationally coupled components, as discussed above.

Memory device 120 includes volatile or non-volatile computer readable memory, such as, for example, random access memory (RAM), read only memory (ROM), flash memory and the like. In an embodiment, processor 110 is configured to execute instructions from one or more programs 124 stored in memory 120, and to generate and manipulate digital data such as cell table data 121, composed image cell table data 122, compressed cell data 123, uncompressed cell data 124, and uncompressed element data 125. In one embodiment, uncompressed element data 125 is raw element image data that has not been preprocessed for conversion into a format that is easily managed by imaging device 100. In another embodiment, compressed cell data 123 is data that defines a page element or a portion of a page element. In one embodiment, cell table 121 includes a list of pointers to memory locations of one or more cells or merged cells that define an element, or a merged page, as will become apparent in subsequent discussion. In still another embodiment, uncompressed cell data is data that defines a merged cell, as will become apparent in subsequent discussion. Program 116 includes one or more computer executable instruction sets that perform functions, such as, for example, controlling scan operations, generating compressed cells that describe image elements, decoding cell tables, half-toning, image effects, optical character recognition (OCR), managing memory, managing conversion and image manipulation of various file formats (e.g., PDF, JPEG, GIF, TIFF, etc.), and managing communication with other devices. In another embodiment, program 116 includes an improved tiled compression algorithm. Conventional compression algorithms include, for example, algorithms based on the Indigo Graphics Format (IGF) as will be known to the skilled practitioner. In one embodiment, one or more of the above components of memory 120 are distributed components of a memory system (not shown) that includes memory 120 and other operationally coupled memory components as discussed above.

Optional scanning device 130 includes any digital scanning apparatus configured to generate a digitized image of a document. Digital scanning mechanisms are well known to the skilled practitioner and will not be further discussed.

Communication port 140 includes one or more communication interfaces configured to provide signal and data input and output to digital sender 110. In an embodiment, communication port 140 includes interfaces such as, for example, a telephone modem, a wireless access point adhering to one or more protocols, such as IEEE 802.11 and the so-called "Bluetooth" protocols, a network interface card, a direct cable interface such as PCI or EIO, a Universal Serial Bus card (USB), an optical port operating in the ultra-violet or infra-red range, and the like. In another embodiment, communication port 140 is a gateway for a local area network (LAN) or a wide area network (WAN) that couples many devices within a geographic zone, such as for example, a business computer network operating within one or more buildings. A communication-enabled device is a device that incorporates a communication gateway, such as communication port 140, having one or more communication interfaces as described above.

Data bus 150 is any bidirectional communication path between connected devices that allows signaling and data transfer. Data buses are well known in the art and will not be further discussed.

In operation, processor 110 executes one or more programs 124 to produce merged pages from a plurality of image elements. Processor 110 controls functions such as receiving formatted image data representing at least one page element for each page of a plurality of pages, generating at least one compressed cell describing each page element based on the received formatted image data where the compressed cell contains pixilated image data and wherein the cell has a predetermined pixel size, generating an element table including at least one cell pointer for each page element where each cell pointer includes a memory location and a cell type for the generated at least one compressed cell, and composing a merged page based on the cell type entries of the element tables. In an embodiment, an improved cell compression algorithm is implemented with the imaging and compression components described above to attain several performance optimizations. Most image data is not accessed during the merge process. The only data that needs to be read from memory are semi-transparent areas of the image which have to be mixed with a background. The merge process itself is neither processor nor memory intensive, since most pixels in the merged elements are not processed. Merged pages consume a relatively small amount of memory so that it is possible to keep a list of already merged pages. During the imaging process, additional overlapping layers are not sent to the imaging hardware. During the imaging process, data is sent compressed into the imaging hardware, saving memory bandwidth and therefore avoiding decompressing and recompressing image data during the merge process. Furthermore, most pixels do not need to undergo a transparent merge. Finally, implementation of rotation and mirroring effects is simplified.

Figure 2:
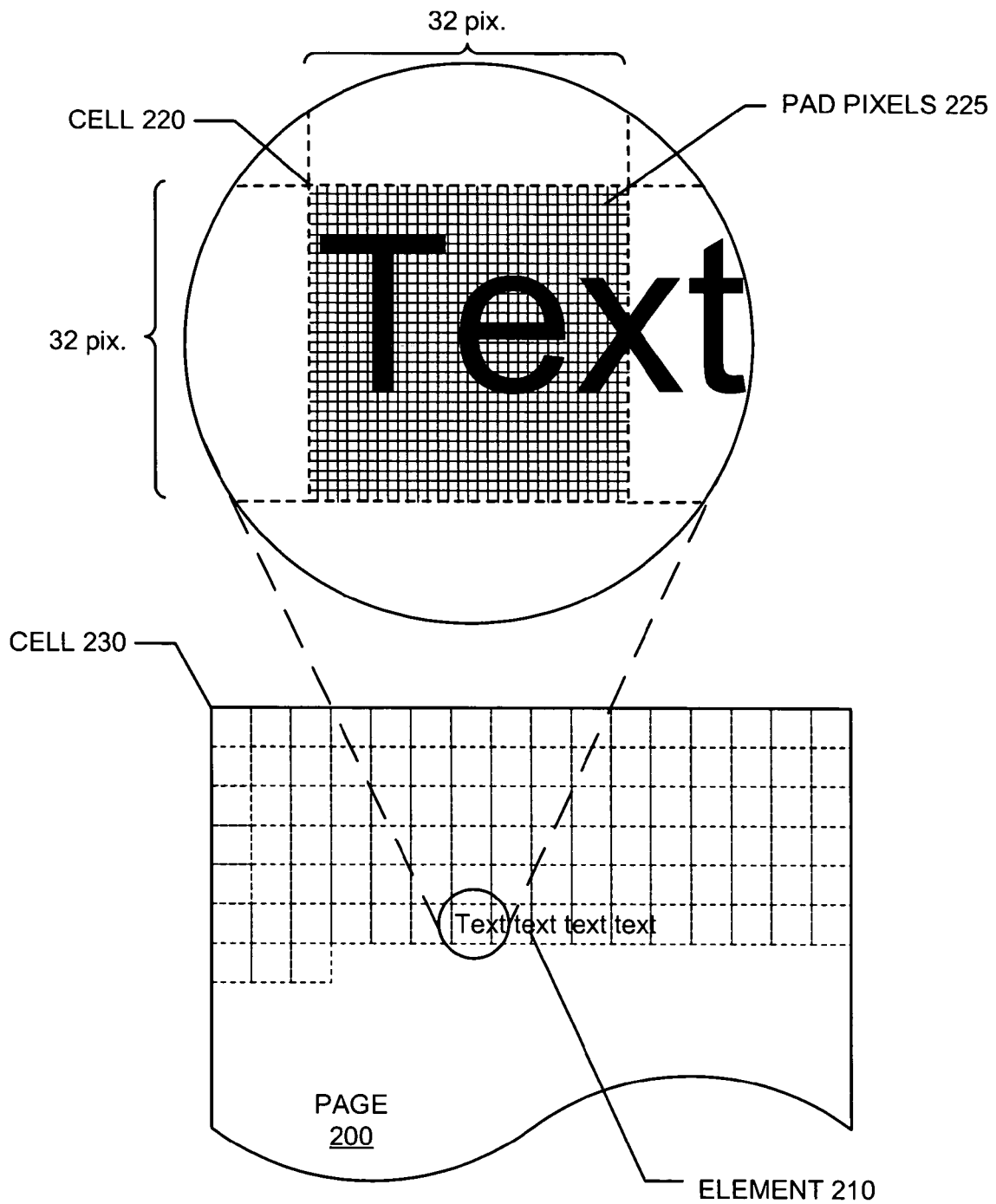
FIG. 2 illustrates a first page and a padded cell of a first page element, in accordance with an embodiment of the present invention.

FIG. 2 illustrates a first page and a padded cell of a first page element. FIG. 2 shows a page 200 having an image element 210 comprised of text. Cell 230 is representative of cells created by a tiled compression algorithm that divides page 200 into cells of a predetermined pixel size by generating padding pixels around identified page elements, then compressing and storing the pixilated image data contained in the cell. As illustrated in FIG. 2, cell 220 is representative of an individual cell generated for page element 210 of page 200. In the embodiment illustrated in FIG. 2, cell 220 has a pixel size of 32 pixels wide by 32 pixels high. In other illustrative embodiments, cell 220 has any suitable pixel size depending on the specific application, balancing factors such as compression ratio, device resources, and system speed. In yet another embodiment, the pixel size of cell 220 is dynamically configurable. FIG. 2 illustrates transparent padding pixels 225 positioned around the left portion of element 210 that positions the text within the cell 220. In an example, a cell compression algorithm generates one or more cells for each page element on a page depending on the size and position of the page element on the page. In another example, a small-font text element, such as an individual letter, is fully defined within a single cell of 32 pixels by 32 pixels dimensions. In the example depicted in FIG. 2, several cells are required to describe the entire text of page element 210. In yet another embodiment, padding pixels are added around an element to position the element in the upper left corner of a cell.

Figure 3:
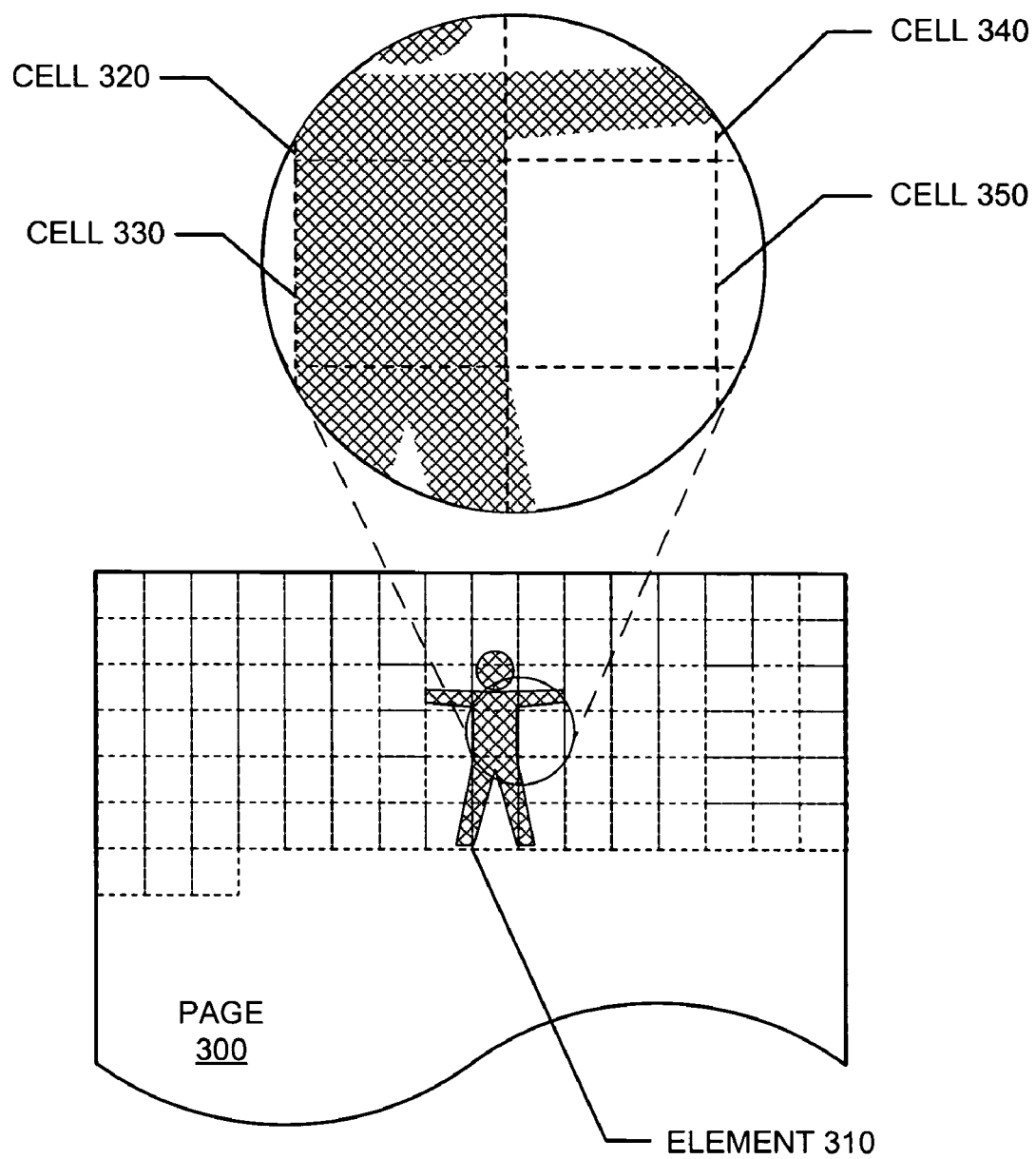
FIG. 3 illustrates a second page having second page element in an example of opaque and transparent cells, in accordance with an embodiment of the present invention.

FIG. 3 illustrates a second page having a second page element in an example of opaque and transparent cells. FIG. 3 shows a page 300 that includes an image element 310 positioned in the field of the page. For visual clarity, the cells of FIG. 2 do not illustrate the component pixels of the illustrated cells as in FIG. 1. However, each cell of FIG. 3 is defined by component pixels as in FIG. 1. As illustrated in FIG. 3, image element 310 is described by several cells including cells 320, 330 and 340. In an embodiment, image element 310 is defined by a table of cell pointers that includes any cell containing a portion of element 310. A cell pointer includes a memory location for a cell and a cell type characterization. The cells are characterized by the opacity of the cell content, and flagged as transparent, opaque or partially transparent by the cell pointer. In an embodiment, an opaque cell is further characterized as a "white" or "black" opaque cell. In an embodiment, each cell is padded with transparent pixels, as described above with reference to FIG. 2, in order to place element 310 on a cell border. In FIG. 3, cell 320 and cell 340 are shown as partially transparent cells where opaque element 310 covers only a portion of the cell. In contrast, all of cell 330 is shown filled with a portion of opaque element 310, and cell 330 is characterized as an opaque cell type. In yet another embodiment, cell 330 is further characterized as a "black" opaque cell type. Cell 350 is shown having no element or background content. In one embodiment, cell 350 is characterized as a transparent cell type. In another embodiment, cell 350 is characterized as a white opaque cell type.

Figure 4:
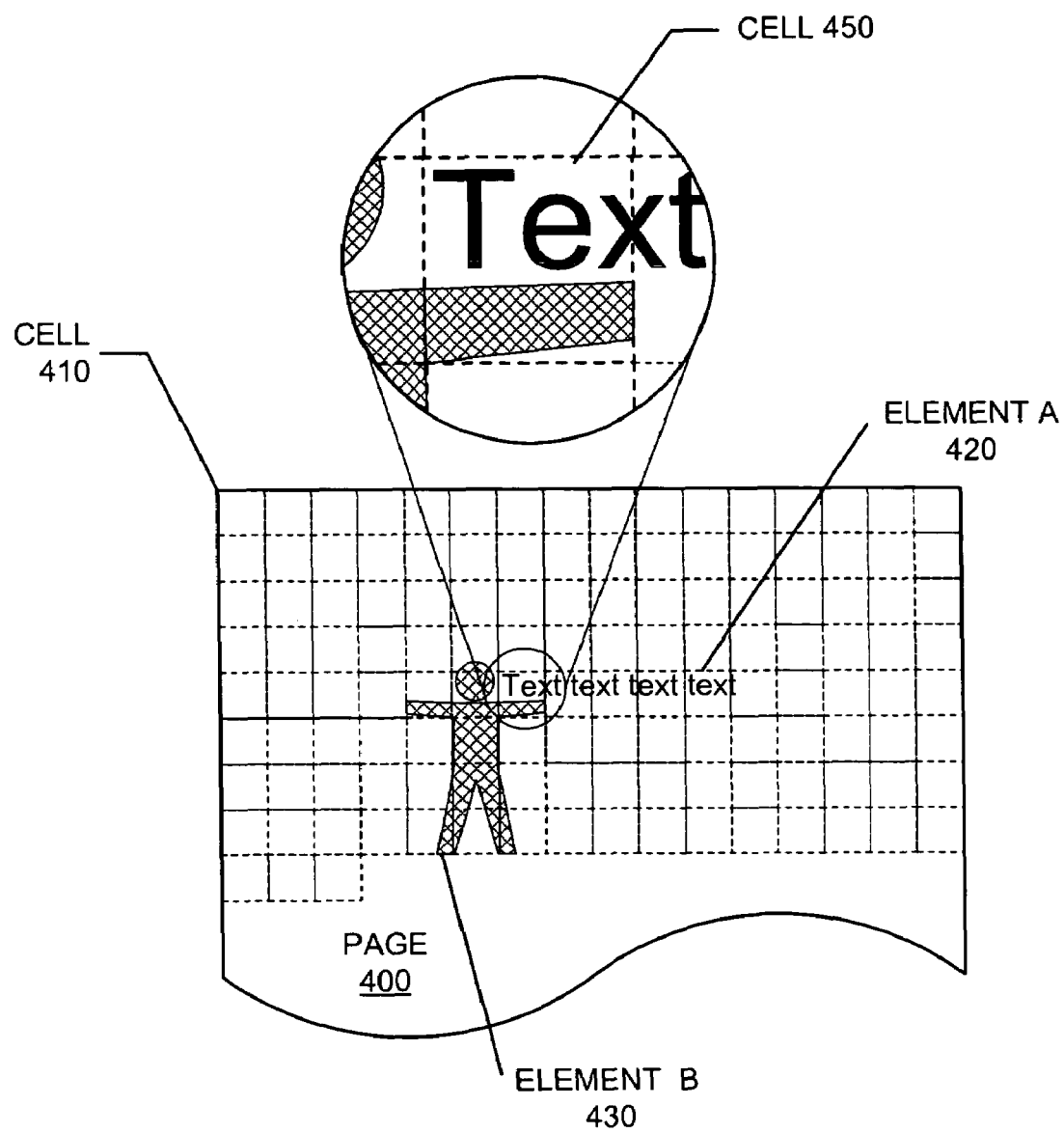
FIG. 4 illustrates a composite of overlapping cells of the first and second elements of FIGS. 2 and 3, in an example of page composition.

FIG. 4 illustrates a composite of overlapping cells of the first and second elements of FIGS. 2 and 3 in an example of page composition. FIG. 4 shows a page 400 that includes a first page element "A" 420 and a second page element "B" 430 positioned in the field of the page. For visual clarity, the cells of FIG. 4 do not illustrate the component pixels of the illustrated cells as in FIG. 1. However, each cell of FIG. 4 is defined by component pixels as in FIG. 1. As illustrated in FIG. 4, the first page element "A" 420 and a second page element "B" 430 overlap the same region of page 400 at cell 450. In an embodiment, page element "A" 420 is defined by a first table of cell pointers that includes any cell of page 400 containing a portion of element 420. In another embodiment, element "B" is defined by a second table of cell pointers that includes any cell of page 400 containing a portion of element "B" 430. In another embodiment, each cell pointer of the first and second pointer tables includes a cell type characterization that identifies the cell as transparent, opaque (either "white" or "black") or partially transparent. In FIG. 4, cell 450 is shown as partially transparent where opaque element "B" 430 covers a portion of the cell, and partially transparent element "A" 420 covers another portion of the cell. In operation, a cell merge algorithm is employed to combine overlapping page elements for cells occupying the same region on page layers. In an example, a first page layer having element "A" 420 is merged with a second page layer having element "B" 430 to generate the content of merged cell 450. In another embodiment, page 400 represents a merged page which is the result of a page composition system in accordance with the present invention.

Figure 5:
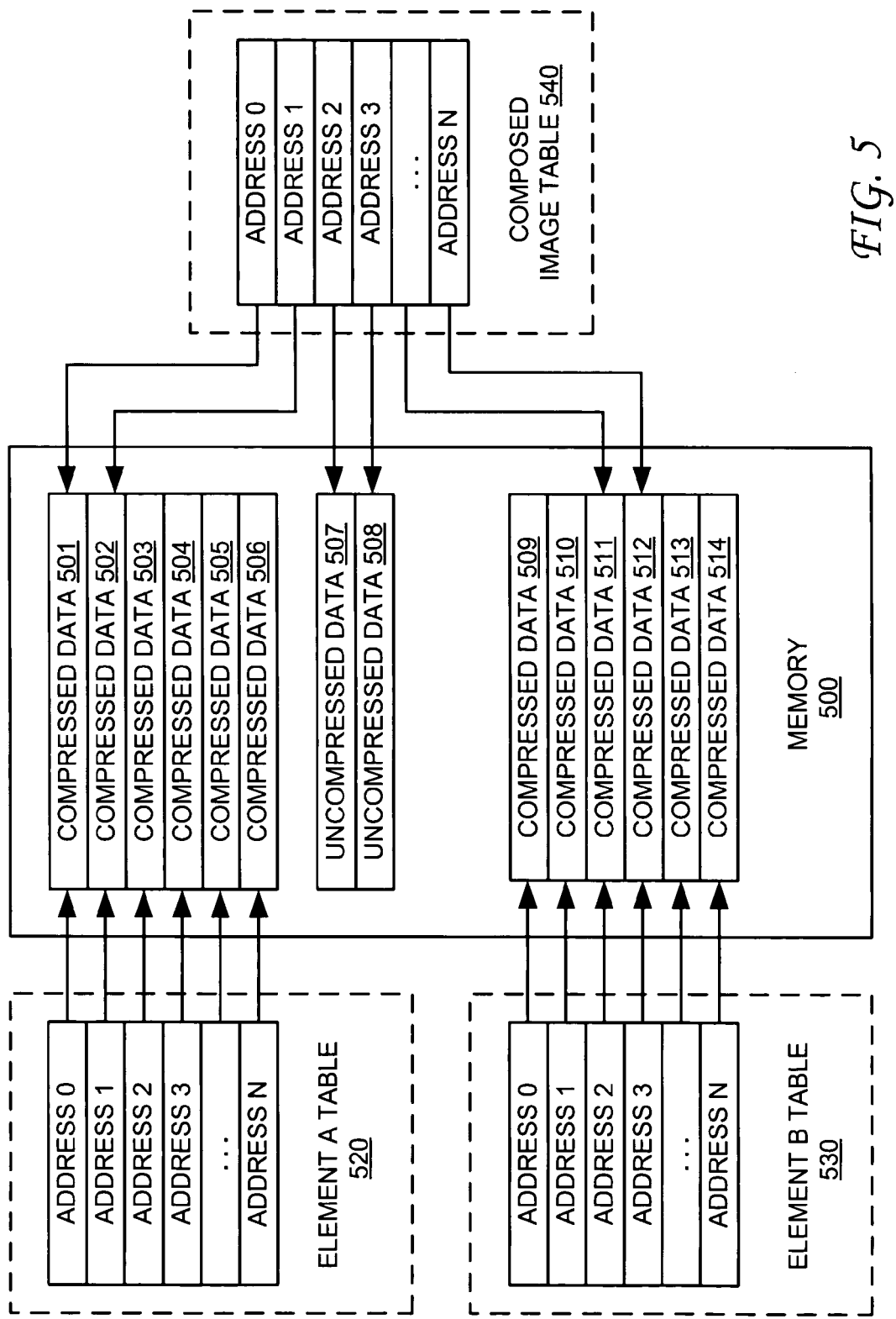
FIG. 5 is a cell memory map for a composite image, such as in FIG. 4, in accordance with an embodiment of the present invention.

FIG. 5 is a cell memory map for a composite image as in FIG. 4 in accordance with an embodiment of the present invention. FIG. 5 shows a memory register 500 that includes compressed and uncompressed data. In one embodiment, the memory register 500 is physical memory. In another embodiment, the memory register 500 is a virtual memory space. In yet another embodiment, the memory register 500 corresponds to a memory component 120 of an imaging system 100, as described with reference to FIG. 1. The compressed and uncompressed data of memory register describes element table "A" 520, element table "B" 530 and a composed image table 540. In operation, element table "A" 520, element table "B" 530 and composed image table 540 are generated according to an embodiment of the present invention.

Element table "A" 520 is a cell pointer table that points to the memory addresses of compressed cells that define a first page element. In an embodiment, element table "A" 520 includes a list of pointers to compressed data representing a text element "A" 420 as shown in FIG. 4. Element table "A" 520 includes a first pointer (address "0") to compressed data 501 that describes a first cell of text element "A" 420. Element table "A" 520 includes a second pointer (address "1") to compressed data 502 that describes a second cell of text element "A" 420. In a similar fashion, element table "A" 520 includes pointers (address "2" to address "N") to compressed cells (503, 504, 505 and 506, where compressed data 506 represents the Nth address of the cells) that describe text element "A" 420.

Similarly, element table "B" 530 is a cell pointer table that points to the memory addresses of compressed cells that define a second page element. In an embodiment, element table "B" 530 includes a list of pointers to compressed data representing an image element "B" 430, as shown in FIG. 4. Element table "B" 530 includes a first pointer (address "0") to compressed data 509 that describes a first cell of image element "B" 430. Element table "B" 530 also includes a second pointer (address "1") to compressed data 510 that describes a second cell of image element "B" 430. In a similar fashion, element table "B" 530 includes pointers (address "2" to address "N") to compressed cells (511, 512, 513 and 514, where compressed data 514 represents the Nth address of the cells) that describe text element "B" 430.

Composed image table 540 is a cell pointer table that points to the memory locations of compressed and uncompressed cells that define a merged page. In an embodiment, composed image table 530 includes a list of pointers to cell data of element table "A" 520, element table "B" 530, and cell data of elements "A" 420 and "B" 430 that have been merged into new cells. Composed image table 540 includes a first pointer (address "0") to compressed data 501 of element table "A" 520 that describes a first cell of element "A" 420. Composed image table 540 includes a second pointer (address "1") to compressed data 502 from element table "A" 520 that describes a second cell of image element "A" 420. In a similar fashion, composed image table 540 includes pointers from element table "B" 530 (address "4" to address "N") to compressed cells (511 and 512 where compressed data 512 represents the Nth address of the included cells) that describe element "B" 430. Composed image table 540 includes pointers (address "2" and address "3") to uncompressed data (507 and 508) that describe merged cells generated by a cell merge algorithm from overlapping cells of elements "A" 420 and "B" 430, as in FIG. 4. A further explanation of methods for generating a composed image follows in FIGS. 6 and 7.

Figure 6:
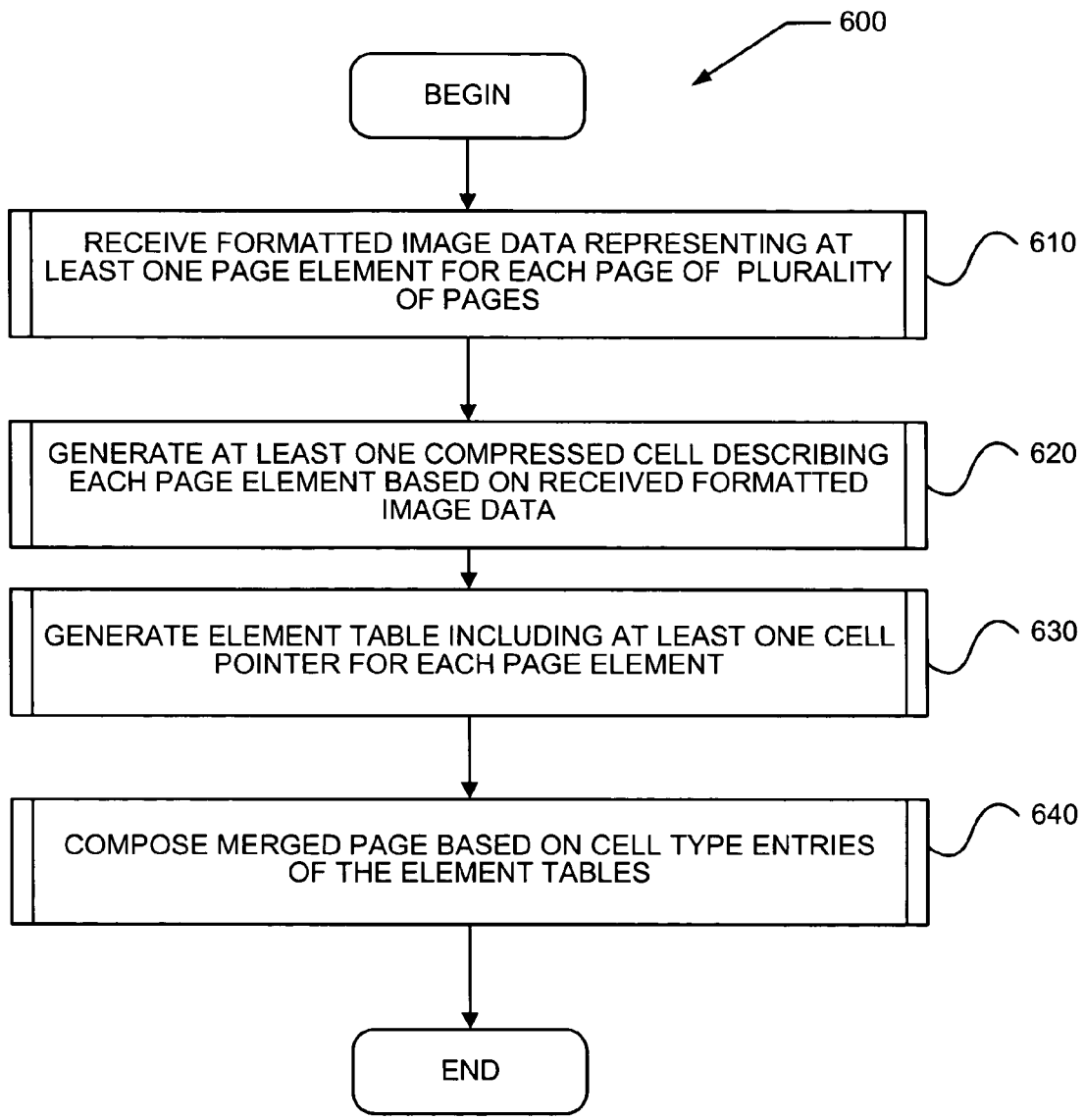
FIG. 6 is a flow diagram depicting a method, in accordance with yet another embodiment of the present invention.

FIG. 6 is a flow diagram depicting a method 600, in accordance with another embodiment of the present invention. FIG. 6 illustrates a method 600 of producing a composed image from a plurality of page elements in a processor-controlled imaging system. In one embodiment, method 600 is implemented with components of the exemplary imaging device of FIG. 1, with various illustrative embodiments described by the graphical representations of FIGS. 2-5. In another embodiment, one or more steps of method 600 are embodied in a computer readable medium containing computer readable code such that a series of steps are implemented when the computer readable code is executed by a computing device. Method 600 begins in step 610. Various steps of the method 600 are described with respect to a processor performing the method. In some implementations, certain steps of method 600 are combined, performed simultaneously or in a different order, without deviating from the objective of method 600 or producing different results.

In step 610, formatted image data representing at least one page element for each page of a plurality of pages is received. In one embodiment, the formatted data is received at any time after the data is formatted. In an embodiment, the formatted image data is received to software or hardware components of an imaging device such as imaging device 100 discussed above with reference to FIG. 1. In another embodiment, formatted image data representing a page element includes preprocessed image data. The preprocessed image data is processed from raw image data such as, for example, images (TIFF, JPEG), vector data (PDF, PostScript), text (with a font associated), and the like. Additional information is provided for each raw image element such as, for example, target rectangle within the page, rotation (not necessarily restricted to a multiple of 90 degrees), mirroring in horizontal and vertical directions, skew, crop box scaling factors for when the element is not scaled to fit the rectangle, and alignment within the target rectangle (centered, left-justified, etc.). Raw text element data includes additional information such as font type and color, justification, and text reflow parameters that limit where to break the text into lines. In one embodiment, raw image element data is stored as uncompressed element data prior to preprocessing.

In another embodiment, the formatted image data is preprocessed by software or hardware prior to receiving the data in order to format the image data for easier data management by imaging device software and hardware. In one embodiment, text element data is converted into a 1 bpp bitmap associated with a foreground and a background color. A background is usually transparent. In another embodiment, a bitmap element is generated from each text character placed at the right position. The text element data conversion takes into account the line reflow, rotation, justification and any other provided text parameters. In yet another embodiment, images are pre-processed to provide, for example, decompression from a native format, color management, cropping, rotation and skew, and scaling to the imaging device's native resolution or a lower resolution. The original unprocessed image element usually has a much lower resolution than native resolution of the imaging device such as, for example, 72 or 150 dots-per-inch (dpi) for the original image versus 600 or 812 dpi for the imaging device. The result of the image preprocessing is a new formatted rectangular image, possibly larger than the original image due to rotation and skew. Some areas of this larger formatted image will be marked as transparent. In yet another embodiment, if scaling, rotation, and skew are defined, these are applied to a vector element during a raster image processor (RIP) process. The result from the vector image preprocessing is an image defined at the imaging device's native resolution, defined in the imaging device's native color space. After the page image elements have been preprocessed, the document is made up of formatted image data such as, for example, binary images (for text elements defined by a 1 bpp bitmap), plus foreground and background colors, images at the imaging device's native resolution and images in the imaging device's native color space, but at a lower resolution than the imaging device's native resolution.

In step 620, at least one compressed cell describing each page element is generated based on the received formatted image data. In one embodiment, the cell is generated at any time after the formatted data is received. In another embodiment, the compressed cell contains pixilated image data and the cell has a predetermined pixel size. In another embodiment, generating a compressed cell includes processing the formatted image data to identify each page element, generating padding pixels around the identified page element to position the origin of the page element on a cell boundary, compressing the pixilated image data of each cell, and storing the compressed pixilated image data to a memory location. In some embodiments, the pixel padding is dependent on the position of an element within a page, causing the same element to produce different compressed images if it appears on different positions on the page. In yet other embodiments, when the original image resolution prior to preprocessing is reduced, fewer pixels in the original image will generate a cell. In another embodiment, the predetermined pixel size of the cell is dynamically configurable. In still another embodiment, the predetermined pixel size of the cell is 32 pixels wide by 32 pixels high.

In step 630, an element table including at least one cell pointer for each page element is generated. In one embodiment, the element table is generated at any time after the compressed cell is generated. In an embodiment, each cell pointer includes a memory location and a cell type for the generated at least one compressed cell. In an embodiment, generating an element table for each page element includes determining a cell memory address for each at least one generated cell of the page element, compiling a pointer list having a pointer to each of the determined cell memory addresses for each generated cell of the element, and storing the pointer list as a table in a memory location. In one embodiment, the location of each cell within memory is computed. This makes it possible to recover individual cells easily. In an embodiment, the cell memory address is not a physical memory address, but rather refers to a different memory space.

In step 640, a merged page is composed based on the cell type entries of the element tables. In one embodiment, the page is composed at any time after an element table is generated. In an embodiment, the page composition system takes the different elements which overlap on each position of a page, and combines them in the appropriate order to build a composed page. In other embodiments, the imaging system reads the address and type of a cell from the element, checks the type of the cell, and, when the cell is opaque, the cell address becomes the address of the merged cell. When the cell is transparent, the merged cell is unchanged, and when the cell is partially transparent, a merge process is initiated to produce a new merged cell. The merged cells are then saved into additional memory. In operation, most cells will be either totally transparent or totally opaque due to the size of the cells, and the merge process is reserved to a minority of partially transparent cells.

In another embodiment, composing a merged page based on the cell type entries of the element tables includes reading a first pointer from a first element table for a first element, reading at least a second pointer from at least a second element table for an at least a second element, determining the cell type indicated by the first pointer and by the at least second pointer, and assigning a merged pointer to a composed image table based on the cell type determinations. In another embodiment, the merged pointer is assigned to the composed image table based on the first and at least second pointers, such that if the first and at least second pointer do not indicate a partially transparent cell type, then the pointer of any of the first or at least second pointers having an opaque cell type is assigned to the composed image table for the corresponding overlapping region.

In yet another embodiment, if the at least second pointer indicates a transparent cell type, then the first pointer is assigned to the composed image table for the corresponding overlapping region. In still another embodiment, if any of the first or at least second pointers indicate a partially transparent cell type, then a cell merge process is initiated to produce a merged cell for the corresponding overlapping region from a first and at least second cell pointed to by the first and at least second pointers, and the merged cell is assigned a memory address that is pointed to by the composed image table.

Another embodiment further includes extracting each cell memory location of the merged page from the composed image table, retrieving the pixilated image data from each of the cell memory location of the element tables merged document information table, decompressing the pixilated image data of each of the cell memory locations, and providing the decompressed pixilated image data to a scan buffer for rendering a merged image. Yet another embodiment further includes re-ordering the decompressed pixilated image data prior to providing the pixilated image data to a scan buffer, and the reordering implements rotation and mirroring effects prior to rendering a merged image. In one embodiment, rotation and mirroring are implemented by extracting the right cells from the elements. For rendering, hardware of the imaging device extracts the cell address from the cell table and accesses the cell content.

There is no limit as to the number of elements which can be merged. Each layer adds the overhead of checking for additional cells. However, the resulting merged page will have the same size. It should be appreciated therefore, that while the description throughout the specification refers to embodiments where cells describing two elements are merged, in other embodiments, multiple elements are combinable via the same processes performed in a sequential element by element manner.

Figure 7:
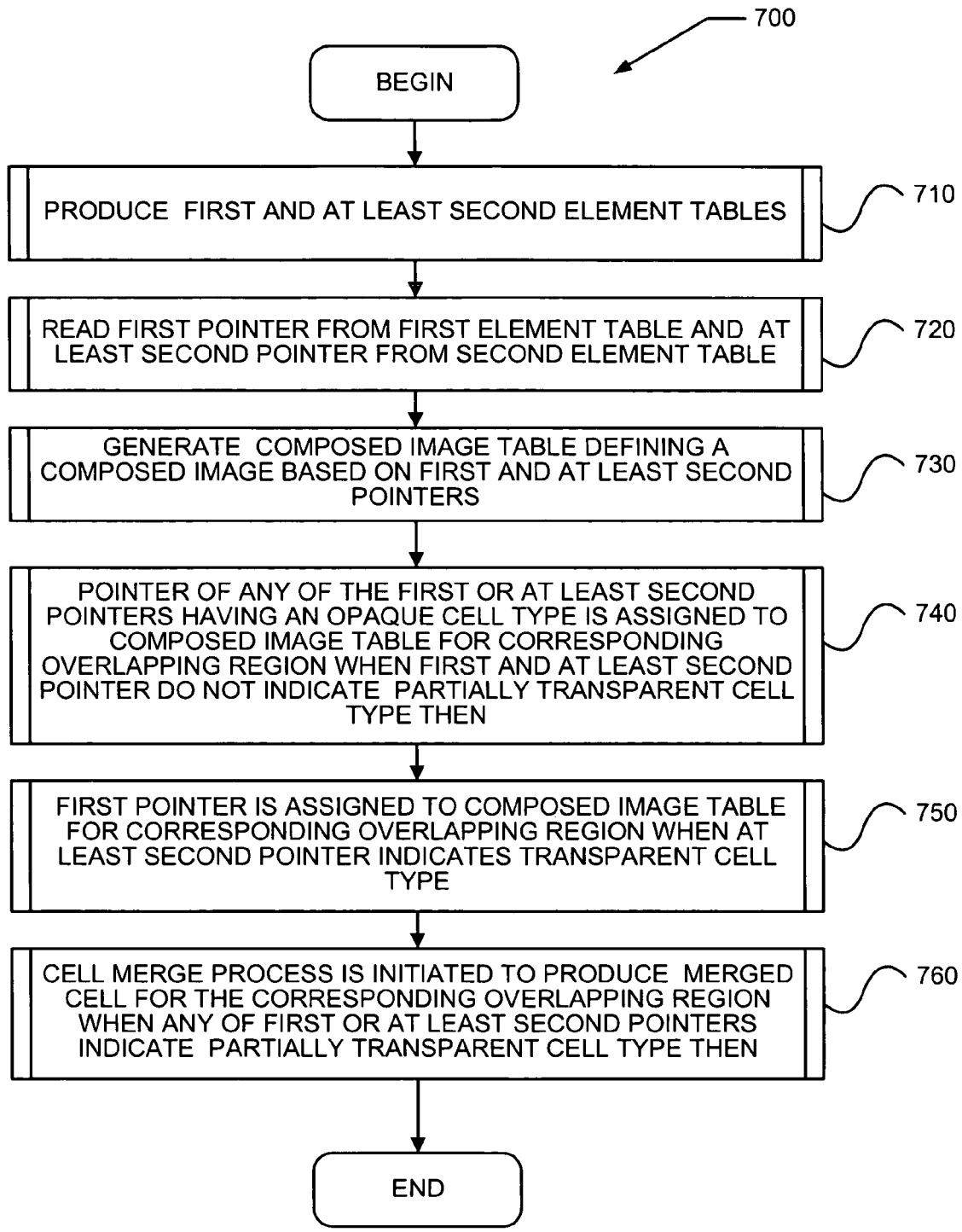
FIG. 7 is a flow diagram depicting a method, in accordance with yet another embodiment of the present invention.

FIG. 7 is a flow diagram depicting a method, in accordance with yet another embodiment of the present invention. FIG. 7 illustrates a method 700 of producing a composed image from a plurality of page elements in a processor-controlled imaging system. In one embodiment, method 700 is implemented with components of the exemplary imaging device of FIG. 1, with illustrative embodiments described by the graphical representations of FIGS. 2-5. In another embodiment, one or more steps of method 700 are embodied in a computer readable medium containing computer readable code, such that a series of steps are implemented when the computer readable code is executed on a computing device. Method 700 begins in step 710. Various steps of the method 700 are described with respect to a processor performing the method. In some implementations, certain steps of method 700 are combined, performed simultaneously or in a different order, without deviating from the objective of method 600 or producing different results.

In step 710, a first element table and at least a second element table are produced. In one embodiment the tables are produced at any time that cells defining a plurality of elements are stored in memory. In another embodiment, the first element table defines a first page element, and the at least a second element table defines a second page element. In yet another embodiment, the first and at least second element tables include at least one pointer to a memory address of a compressed cell describing a first page element and at least a second page element, and the page elements correspond to overlapping regions.

In still another embodiment, producing a first element table defining a first page element, and at least a second element table defining at least a second page element, includes: (a) receiving preprocessed page element data including data representing a first page element and at least a second page element; (b) padding the first page element with transparent pixels to position the first page element on a first cell boundary, wherein an at least first element cell is generated having a predetermined pixel size; (c) padding the at least second page element with transparent pixels to position the at least second page element on a second cell boundary, wherein an at least second element cell is generated having the predetermined pixel size; and (d) compressing the at least first element cell into a first cell memory location, and compressing the at least second element cell into a second cell memory location.

In another embodiment, pointers to the at least first and at least second element cell memory locations are included in the first element table and the at least second element table. In yet another embodiment, the predetermined pixel size of the cell is dynamically configurable. In still another embodiment, the predetermined pixel size of the cell is 32 pixels by 32 pixels.

In step 720, a first pointer is read from the first element table, and at least a second pointer is read from the second element table. In one embodiment, the pointers are read from the element tables at any time after the element tables are generated. In another embodiment, the pointers indicate a cell type (opaque; e.g., black, white, colored, or not specified, transparent, partially transparent). In another embodiment, the first and at least second pointers correspond to cells defining a plurality of elements that overlap on a region of a page.

In step 730, a composed image table is generated defining a composed image based on the first and at least second pointers. The composed image is generated at any time after the pointers are read from the first and at least second element tables. In one embodiment, steps 730 through 760 occur concurrently. In another embodiment, steps 740 through 760 comprise a subset of steps performed at step 730.

In step 740, the pointer of any of the first or at least second pointers having an opaque cell type is assigned to the composed image table for the corresponding overlapping region when the first and at least second pointer do not indicate a partially transparent cell type. In one embodiment, the pointer is assigned at any time after the cell type is determined. In another embodiment, an opaque cell type is characterized as either "white" or "black".

"In step 750, the first pointer is assigned to the composed image table for the corresponding overlapping region when the at least second pointer indicates a transparent cell type. A transparent cell type has no impact on subsequent layers. In one embodiment, the pointer is assigned at any time after the cell type is determined.

In step 760, a cell merge process is initiated to produce a merged cell for the corresponding overlapping region from a first and at least second cell pointed to by the first and at least second pointers when any of the first or at least second pointers indicate a partially transparent cell type. In one embodiment, the cell merge process is initiated at any time after a partially transparent cell type is determined in an element.

In another embodiment, the merged cell is assigned a memory address that is pointed to by the composed image table. In yet another embodiment, the cell merge process initiated to produce a merged cell includes retrieving compressed formatted data from a first cell address and at least a second cell address, and in this instance the first cell address corresponds to the first cell pointer, and the at least second cell address corresponds to the at least second pointer. Further, in this instance, the merge process includes decompressing the formatted data from the first and at least second cell address, and merging the formatted data from the first and the at least second cell address in to a merged cell that is pointed to by the merged element table.

Another embodiment further includes extracting at least one cell address of the composed image table, retrieving formatted data from the at least one cell address of the composed image table, decompressing the retrieved formatted data, and providing the decompressed formatted data to a scan buffer.

Yet another embodiment includes reordering the decompressed formatted data prior to providing the formatted data to a scan buffer wherein the reordering implements rotation and mirroring effects.

In accordance with an embodiment of the present invention, a series of Computer 27 readable instructions for implementing one or more steps of methods 600 and 700 are 28 illustrated by a high-level computer language program, such as, for example: the computer program listing incorporated by reference herein.

It is anticipated that the invention will be embodied in other specific forms not described that do not depart from its spirit or essential characteristics. The described embodiments are to be considered in all respects only as illustrative and not restrictive, the scope of the invention being defined by the appended claims and equivalents thereof.

I claim:

1. A method of selective page composition in a processor-controlled imaging system, comprising:
    receiving formatted image data representing at least one page element for each page of a plurality of pages at a processor of an imaging device;
    applying, at the processor of the imaging device, one of: scaling, rotation, and skew to a vector element of the formatted image data during a raster image processor (RIP) process to generate a processed vector element such that the processed vector element of the image data is in a native resolution and a native color space of the imaging device;
    generating, at the processor of the imaging device, at least one compressed cell describing each page element based on a size and a position of each page element included in the received formatted image data, wherein the compressed cell contains pixilated image data, and presents a transparency condition, and a predetermined pixel size;
    generating, at the processor of the imaging device, an element table including a cell pointer for each page element wherein the cell pointer is used to indicate a memory location and a cell type for the generated at least one compressed cell compression; and
    selectively merging, at the processor of the imaging device, the cell data based on the cell type entries of the element tables, so as to compose a merged page,
    wherein a first portion of the image data of the merged page is not accessed during merging of the cell data to compose the merged page, and where only a second portion of the image data is accessed during merging of the cell data to compose the merged page, the second portion of the image data being semi-transparent areas that are mixed with a background within the merged page.

2. The method of claim 1 and wherein generating at least one compressed cell describing each page element comprises: processing the formatted image data to identify each page element; generating padding pixels around the identified page element to position the origin of the page element on a cell boundary; compressing the pixilated image data of each cell; and storing the compressed pixilated image data to a memory location.

3. The method of claim 1 wherein the predetermined pixel size of the cell is dynamically configurable.

4. The method of claim 1 and wherein the predetermined pixel size of the cell is 32 pixels by 32 pixels.

5. The method of claim 1 and wherein generating an element table for each page element comprises:
    determining a cell memory address for each at least one generated cell of the page element;
    compiling a pointer list having a pointer to each of the determined cell memory addresses for each generated cell of the element; and
    storing the pointer list as a table in a memory location.

6. The method of claim 1, and wherein composing a merged page based on the cell type entries of the element tables comprises:
 reading a first pointer from a first element table for a first element; reading at least a second pointer from at least a second element table for an at least a second element;
 determining the cell type indicated by the first pointer and by the at least second pointer; and
 assigning a merged pointer to a composed image table based on the cell type determinations.

7. The method of claim 6 and wherein the merged pointer is assigned to the composed image table based on the first and at least second pointers, wherein:
 if the first and at least second pointer do not indicate a partially transparent cell type, then the pointer of any from a set of the first and the at least second pointers having an opaque cell type is assigned to the composed image table for the corresponding overlapping region;
 if the at least second pointer indicates a transparent cell type, then the first pointer is assigned to the composed image table for the corresponding overlapping region; and
 if any from a set of the first and the at least second pointers indicate a partially transparent cell type, then a cell merge process is initiated to produce a merged cell for the corresponding overlapping region from a first and at least second cell pointed to by the first and at least second pointers, and wherein the merged cell is assigned a memory address that is pointed to by the composed image table.

8. The method of claim 6, and further comprising:
 extracting each cell memory location of the merged page from the composed image table;
 retrieving the pixilated image data from each of the cell memory location of the element tables merged document information table;
 decompressing the pixilated image data of each of the cell memory locations; and providing the decompressed pixilated image data to a scan buffer for rendering a merged image.

9. The method of claim 8, and further comprising reordering the decompressed pixilated image data prior to providing the pixilated image data to a scan buffer wherein the reordering implements rotation and mirroring effects prior to rendering a merged image.

10. The method of claim 1, and further comprising printing the merged page on media.

11. A method of producing a composed image from a plurality of page elements in a processor-controlled imaging system, comprising:
 producing a first element table and at least a second element table at a processor of an imaging device, wherein the first element table defines a first page element based on a size and a position of the first page element, and the at least a second element table defines at least a second page element based on a size and a position of the second page element;
 reading a first pointer from the first element table and at least a second pointer from the at least second element table, wherein the pointers are used to indicate a cell type, wherein the first and at least second pointers are further used to organize the first element table and at least the second element table, and wherein the first and at least second pointers correspond to an overlapping region; and
 generating a composed image table defining a composed image based on the first and at least second pointers, via a merging process, wherein:
 if the first and at least second pointer is not used to indicate a partially transparent cell type, then the pointer of any from a set of the first and at least second pointers having an opaque cell type is assigned to the composed image table for the corresponding overlapping region;
 if the at least second pointer is used to indicate a transparent cell type, then the first pointer is assigned to the composed image table for the corresponding overlapping region; and
 if any from a set of the first and at least second pointers is used to indicate a partially transparent cell type, then a cell merge process is initiated to produce a merged cell for the corresponding overlapping region from a first and at least second cell pointed to by the first and at least second pointers, and wherein the merged cell is assigned a memory address that is pointed to by the composed image table and
 defining the composed image further comprises applying one of: scaling, rotation, and skew to a vector element of the formatted image data during a raster image processor (RIP) process to generate a processed vector element such that the processed vector element of the image data is in a native resolution and a native color space of the imaging device,
 wherein a first portion of the image data of the merged page is not accessed during the merging process to generate the composed image, and where only a second portion of the image data is accessed during the merging process to generate the composed image, the second portion of the image data being semi-transparent areas that are mixed with a background within the composed image.

12. The method of claim 11, and wherein the cell merge process initiated to produce a merged cell comprises:
 retrieving compressed formatted data from a first cell address and at least a second cell address, wherein the first cell address corresponds to the first cell pointer, and the at least second cell address corresponds to the at least second pointer;
 decompressing the formatted data from the first and at least second cell address; and
 merging the formatted data from the first and the at least second cell address in to a merged cell that is pointed to by the composed image table.

13. The method of claim 11, and wherein producing a first element table defining a first page element and at least a second element table defining at least a second page element comprises:
 receiving preprocessed page element data including data representing a first page element and at least a second page element;
 padding the first page element with transparent pixels to position the first page element on a first cell boundary, wherein an at least first element cell is generated having a predetermined pixel size;
 padding the at least second page element with transparent pixels to position the at least second page element on a second cell boundary, wherein an at least second element cell is generated having the predetermined pixel size; and
 compressing the at least first element cell into a first cell memory location and the at least second element cell into a second cell memory location, and wherein pointers to the at least first and at least second element cell memory locations are included in the first element table and the at least second element table.

14. The method of claim 13 and wherein the predetermined pixel size of the first cell and the second cell is dynamically configurable.

15. The method of claim 13 and wherein first cell and the second cell are 32 pixels by 32 pixels.

16. The method of claim 11, and further comprising:
extracting at least one cell address of the composed image table;
retrieving formatted data from the at least one cell address of the composed image table;
decompressing the retrieved formatted data; and
providing the decompressed formatted data to a scan buffer.

17. The method of claim 15, and further comprising reordering the decompressed formatted data prior to providing the formatted data to a scan buffer wherein the reordering implements rotation and mirroring effects.

18. A computer readable medium storing a computer program to manage page composition in an imaging system, comprising:
computer readable code to direct the reception of formatted image data representing at least one page element for each page of a plurality of pages;
computer readable code to apply one of: scaling, rotation, and skew to a vector element of the formatted image data during a raster image processor (RIP) process to generate a processed vector element such that the processed vector element of the image data is in a native resolution and a native color space of the imaging device;
computer readable code to generate at least one compressed cell describing each page element based on a size and a position of each page element included in the received formatted image data, wherein the compressed cell contains pixilated image data, and wherein the cell has a predetermined pixel size;
computer readable code to generate an element table including a cell pointer for each page element, wherein the cell pointer is used to indicate a memory location and a cell type for the generated at least one compressed cell, and wherein the cell pointer is further used to organize the formatted image data in each cell prior to compression; and
computer readable code to direct the composing of a merged page, via a merging process, based on the cell type entries of the element tables,
wherein a first portion of the image data of the merged page is not accessed during the merging process to compose the merged page, and where only a second portion of the image data is accessed during the merging process to compose the merged page, the second portion of the image data being semi-transparent areas that are mixed with a background within the merged page.

19. The computer readable medium of claim 18, and wherein computer readable code to generate at least one compressed cell describing each page element comprises:
computer readable code to process the formatted image data to identify each page element;
computer readable code to generate padding pixels around the identified page element to position the origin of the page element on a cell boundary;
computer readable code to compress the pixilated image data of each cell; and computer readable code to store the compressed pixilated data to a memory location.

20. The computer readable medium of claim 18, and wherein computer readable code to generate an element table for each page element comprises:
computer readable code to determine a cell memory address for each at least one generated cell that of the page element;
computer readable code to compile a pointer list having a pointer to each of the determined cell memory addresses for each generated cell of the element; and computer readable code to store the list of pointers as a table in a memory location.

21. The computer readable medium of claim 19, and wherein computer readable code to compose a merged page based on the cell type entries of the element tables comprises:
computer readable code to read a first pointer from a first element table for a first element;
computer readable code to read at least a second pointer from at least a second element table for at least a second element;
computer readable code to determine the cell type indicated by the first pointer and by the at least second pointer; and
computer readable code to assign a merged pointer to a composed image table based on the cell type determinations.

22. The computer readable medium of claim 21, and wherein the merged pointer is assigned to the composed image table by the computer readable code based on the first and at least second pointers, wherein:
if the first and at least second pointer do not indicate a partially transparent cell type, then the pointer of any from a set of the first and at least second pointers having an opaque cell type is assigned by the computer readable code to the composed image table for the corresponding overlapping region;
if the at least second pointer indicates a transparent cell type, then the first pointer is assigned by the computer readable code to the composed image table for the corresponding overlapping region; and
if any from a set of the first and at least second pointers indicate a partially transparent cell type by the computer readable code, then a cell merge process is initiated by the computer readable code to produce a merged cell for the corresponding overlapping region from a first and at least second cell pointed to by the first and at least second pointers, and wherein the merged cell is assigned a memory address by the computer readable code that is pointed to by the composed image table.

23. The computer readable medium of claim 21, and further comprising:
computer readable code to extract each cell memory location of the merged page from the composed image table;
computer readable code to retrieve the pixilated image data from each of the cell memory location of the element tables merged document information table;
computer readable code to decompress the pixilated image data of each of the cell memory locations; and
computer readable code to provide the decompressed pixilated image data to a scan buffer for rendering a merged image.

24. The computer readable medium of claim 23, and further comprising computer readable code to reorder the decompressed pixilated image data prior to providing the pixilated image data to a scan buffer wherein the reordering implements rotation and mirroring effects.

25. The computer readable medium of claim 18 and further comprising computer readable code to print the composed image on media.

26. An imaging apparatus configured to provide page composition, comprising:
 a communication bus;
 at least one processor; and
 at least one computer readable memory device which is readable by the processor, and wherein the computer readable memory device contains a series of computer executable steps configured to cause the processor to:
  receive formatted image data representing at least one page element for each page of a plurality of pages;
  apply one of: scaling, rotation, and skew to a vector element of the formatted image data during a raster image processor (RIP) process to generate a processed vector element such that the processed vector element of the image data is in a native resolution and a native color space of the imaging device;
  generate at least one compressed cell describing each page element based on a size and a position of each page element included in the acquired formatted image data, wherein the compressed cell contains pixilated image data, and wherein the cell has a pre-determined pixel size;
  generate an element table including a cell pointer for each page element, wherein the cell pointer is used to indicate a memory location and a cell type for the generated at least one compressed cell, and wherein the cell pointer is further used to organize cell data prior to compression; and
  compose a merged page by merging cells in the page based on the cell type entries of the element tables, via a merging process,
 wherein a first portion of the image data of the merged page is not accessed during the merging process to compose the merged page, and where only a second portion of the image data is accessed during the merging process to compose the merged page, the second portion of the image data being semi-transparent areas that are mixed with a background within the merged page.

27. The imaging apparatus of claim 26, and wherein the computer executable steps to generate at least one compressed cell describing each page element comprise a series of computer executable steps configured to cause the processor to:
 process the formatted image data to identify each page element;
 generate padding pixels around the identified page element to position the origin of the page element on a cell boundary;
 compress the pixilated image data of each cell; and store the compressed pixilated image data to a memory location.

28. The imaging apparatus of claim 26, and wherein the series of computer executable steps configured to generate an element table for each page element comprise a series of computer executable steps configured to cause the processor to:
 determine a cell memory address for each at least one generated cell of the page element;
 compile a pointer list having a pointer to each of the determined cell memory addresses for each generated cell of the element; and store the pointer list as a table in a memory location.

29. The imaging apparatus of claim 26, and wherein the computer executable steps configured to cause the processor to composing a merged page based on the cell type entries of the element tables comprise a series of computer executable steps configured to cause the processor to:
 read a first pointer from a first element table for a first element; read at least a second pointer from at least a second element table for an at least a second element;
 determine the cell type indicated by the first pointer and by the at least second pointer; and
 assign a merged pointer to a composed image table based on the cell type determinations.

30. The imaging apparatus of claim 29, and wherein the merged pointer is assigned to the composed image table by the computer readable code based on the first and at least second pointers, wherein:
 if the first and at least second pointer do not indicate a partially transparent cell type, then the pointer of any from a set of the first and at least second pointers having an opaque cell type is assigned by the computer readable code to the composed image table for the corresponding overlapping region;
 if the at least second pointer indicates a transparent cell type, then the first pointer is assigned by the computer readable code to the composed image table for the corresponding overlapping region; and
 if any a set of the first and at least second pointers indicate a partially transparent cell type by the computer readable code, then a cell merge process is initiated by the computer readable code to produce a merged cell for the corresponding overlapping region from a first and at least second cell pointed to by the first and at least second pointers, and wherein the merged cell is assigned a memory address by the computer readable code that is pointed to by the composed image table.

31. The imaging apparatus of claim 29, and further comprising a series of computer executable steps configured to cause the processor to:
 extract each cell memory location of the merged page from the composed image table;
 retrieve the pixilated image data from each of the cell memory location of the element tables merged document information table;
 decompress the pixilated image data of each of the cell memory locations; and provide the decompressed pixilated image data to a scan buffer for rendering a merged image.

32. The imaging apparatus of claim 31, and further comprising a series of computer executable steps configured to cause the processor to:
 reorder the decompressed pixilated image data prior to providing the pixilated image data to a scan buffer, wherein the reordering implements rotation and mirroring effects prior to rendering a merged image.

33. The imaging apparatus of claim 26, and wherein the computer executable steps configured to cause the processor to print the composed image on media.

34. The imaging apparatus of claim 26 and wherein the at least one processor is an imaging processor and wherein the imaging processor includes components selected from the group consisting of a direct memory access controller, a cell table decoder, a decompression engine, a half-toning engine, and a scan buffer.

35. A system for page composition in peripheral device, comprising:
 an imaging device including;
 data communication means;
 at least one processing means; and computer readable memory means which is readable by the processing means, the computer readable memory means containing a series of computer executable steps configured to cause the processing means to:

produce a first element table and at least a second element table, wherein the first element table defines a first page element based on a size and a position of the first page element and the at least a second element table defines at least a second page element based on a size and a position of the second page element;

read a first pointer from the first element table and at least one second pointer from the at least second element table, wherein the first pointer and the at least one second pointer are used to indicate a cell type, and wherein the first and at least second pointers correspond to an overlapping region;

generate a composed image table defining a composed image based on the first and at least second pointers, via a merging process, wherein:

if the first and at least second pointer is not used to indicate a partially transparent cell type, then the pointer of any from a set of the first and at least second pointers having an opaque cell type is assigned to the composed image table for the corresponding overlapping region;

if the at least second pointer is used to indicate a transparent cell type, then the first pointer is assigned to the composed image table for the corresponding overlapping region; and if any from a set of the first and at least second pointers is used to indicate a partially transparent cell type, then a cell merge process is initiated to produce a merged cell for the corresponding overlapping region from a first and at least second cell pointed to by the first and at least second pointers, and wherein the merged cell is assigned a memory address that is pointed to by the composed image table and defining the composed image further comprises applying one of: scaling, rotation, and skew to a vector element of the formatted image data during a raster image processor (RIP) process to generate a processed vector element such that the processed vector element of the image data is in a native resolution and a native color space of the imaging device, wherein a first portion of the image data of the composed image is not accessed during the merging process to define the composed image, and where only a second portion of the image data is accessed during the merging process to define the merged composed, the second portion of the image data being semi-transparent areas that are mixed with a background within the composed image.

36. The system of claim 35 and wherein the series of computer executable steps to produce a merged cell when the cell merge process is initiated comprise computer executable steps configured to cause the processing means to:

retrieve compressed formatted data from a first cell address and at least a second cell address, wherein the first cell address corresponds to the first cell pointer, and the at least second cell address corresponds to the at least second pointer;

decompress the formatted data from the first and at least second cell address; and merge the formatted data from the first and the at least second cell address in to a merged cell that is pointed to by the composed image table.

37. The system of claim 35, and wherein the series of computer executable steps are further configured to cause the processing means to:

extract at least one cell address of the composed image table;

retrieve formatted data from the at least one cell address of the composed image table;

decompress the retrieved formatted data; and provide the decompressed formatted data to a scan buffer.

38. The system of claim 37, and wherein the series of computer executable steps are further configured to reorder the decompressed formatted data prior to providing the formatted data to a scan buffer wherein the reordering implements rotation and mirroring effects.

39. The system of claim 35, and wherein the series of computer executable steps to produce a first element table defining a first page element and at least a second element table defining at least a second page element comprise computer executable steps configured to cause the processing means to:

receive preprocessed page element data including data representing a first page element and at least a second page element;

pad the first page element with transparent pixels to position the first page element on a first cell boundary, wherein an at least first element cell is generated having a predetermined pixel size;

pad the at least second page element with transparent pixels to position the at least second page element on a second cell boundary, wherein an at least second element cell is generated having the predetermined pixel size; and compress the at least first element cell into a first cell memory location and the at least second element cell into a second cell memory location, and wherein pointers to the at least first and at least second element cell memory locations are included in the first element table and the at least second element table.

* * * * *

UNITED STATES PATENT AND TRADEMARK OFFICE
CERTIFICATE OF CORRECTION

PATENT NO. : 7,672,521 B2  Page 1 of 1
APPLICATION NO. : 10/929232
DATED : March 2, 2010
INVENTOR(S) : Rodolfo Jodra It is certified that error appears in the above-identified patent and that said Letters Patent is hereby corrected as shown below:

In column 14, line 21, in Claim 11, delete "table and" and insert -- table; and --, therefor.

In column 19, line 38, in Claim 35, delete "table and" and insert -- table; and --, therefor.

Signed and Sealed this

Thirty-first Day of August, 2010

David J. Kappos
*Director of the United States Patent and Trademark Office*